United States Patent

[11] 3,537,604

[72] Inventors Edwin Lee Whisler
Moline, Illinois;
Robert Paul Zimmerman, Davenport, Iowa
[21] Appl. No. 721,303
[22] Filed April 15, 1968
[45] Patented Nov. 3, 1970
[73] Assignee Deere & Company
Moline, Illinois
a corporation of Delaware

[54] LOG-HANDLING DEVICE
14 Claims, 5 Drawing Figs.
[52] U.S. Cl. .................................................. 214/651,
214/1; 294/14; 254/139.1; 294/106; 144/2,
144/309
[51] Int. Cl. ...................................................... B66f 9/18
[50] Field of Search ............................................. 214/651, 1;
294/74, 78, 111, 106, 113; 254/139.1; 212/7;
144/3.4, 2.21, 34, 34.1, 34.2, 34.3, 34.4, 34.5,
34.6, 309.34; 251/139.1

[56] References Cited
UNITED STATES PATENTS
2,827,715 3/1958 Wagner .......................... 254/139.1UX
3,102,562 9/1963 Horncastle .................... 144/34X

*Primary Examiner*—Gerald M. Forlenza
*Assistant Examiner*—George F. Abraham
*Attorney*—H. V. Harsha, Harold M. Knoth, William A. Murray and John M. Nolan ABSTRACT: A log-pulling and log-gripping device that is composed of a rearwardly opening U-shaped structure fixed to and extending rearwardly from a tractor and in which the sides of the U-shaped structure are composed of forward rigid arms and rearward extensions that are swingable inwardly and forwardly. A winch-operated cable extends through the free ends of the extensions so that a log may be placed on the cable. The cable is then drawn up to swing the arms inwardly and forwardly while at the same time causing the cable extending between the free ends to grip the log.

Patented Nov. 3, 1970  3,537,604

INVENTORS
EDWIN L. WHISLER &
ROBERT P. ZIMMERMAN
BY William A. Murray
ATTORNEY 3,537,604

LOG-HANDLING DEVICE

BACKGROUND OF THE INVENTION

This invention relates to a log accumulator or pulling device that is carried on the rear end of a tractor and operates to grip one end of a log or fallen tree so that the tractor may pull it to a desired location. More particularly this invention relates to an accumulator that utilizes a pair of swingable arms and a cable extending in catenary fashion between the arms so that as the cable is drawn tightly around the log or logs, it also creates movement of the swingable arms toward one another.

It has heretofore been known to provide accumulators that utilize swingable arms in combination with a cable so that as the cable is tightened around a log it affects movement of the arms toward one another. Such a device is shown in U.S. Pat. No. 3,102,562 which was issued to D. C. Horncastle on 3 Sept. 1963. In that device the swingable arms are carried on fore-and-aft horizontal axes and they are biased to be retained in their upper or vertical positions. Cables extend between the upper ends of the arms in catenary fashion and consequently as logs are introduced into the area between the extensible arms the cable will engage the logs. Upon the winch taking up the cable, the arms will swing downwardly and toward one another while at the same time the cable grips the log or logs. However, in the Horncastle structure the movable arms are positioned directly over the transport wheels for the frame. This is undoubtedly necessary for the reason it is desirable to carry the log as closely as possible over the wheels for proper distribution of the load when logs are attached. For this reason the structure extending between the wheels must be retained open except for the movable arms. For this reason the entire structure must be of a drawn type implement since such an accumulator could not be mounted as a direct attachment to a tractor whereby the rear wheels of the tractor could be utilized as the wheels for the accumulator.

SUMMARY OF THE INVENTION

With the above in mind it is the primary object of the present invention to provide an accumulator having swingable arms and operated through use of a cable that may be mounted on the rear portion of a tractor or any other type of mobile frame so that the axle structure may extend directly between the two wheels. Specifically it is the primary object of the present invention to provide a horizontal and rearwardly opening U-shaped structure that may be fixed to a mobile frame so as to extend rearwardly thereof. The sides of the U-shaped structure are formed of forward rigid arms and rearwardly extending extensions that are swingable horizontally and forwardly. A winch-operated cable extends between the extensions and consequently as the cable is tightened it will cause gripping of the log or logs while at the same time the arm extensions are moved forwardly toward the axle structure of the tractor. Thus, while loading, the U-shaped structure extends considerably rearwardly of the wheels so that the logs may be dropped or moved into the rearwardly opening between the sides of the U-shaped frame. However, while in transport, the arms are adapted to move the load of the logs close to the axle structure so as to approach better balance and load distribution on the tractor.

DESCRIPTION OF THE PREFERRED EMBODIMENT

Figures 2, 3, 5:
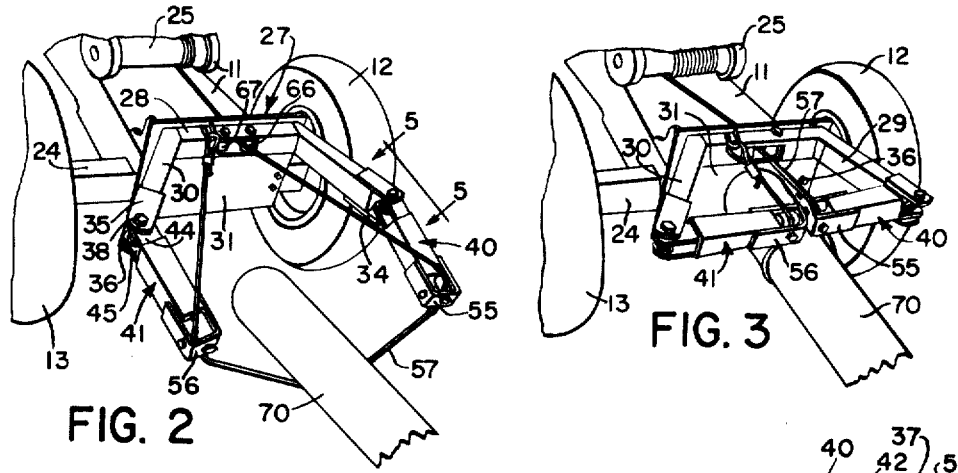
FIG. 2 is a rear perspective view of the rear portion of the tractor and accumulator with the harvesting mechanism removed from the tractor for a better view of the accumulator structure.
FIG. 3 is a view similar to FIG. 2 but showing the parts of the accumulator in different positions.
FIG. 5 is a view taken substantially along the line 5-5 of FIG. 2.

The harvesting structure to be described in only general terms for purposes of orientation is supported on a tractor 10, the rear portion of which is shown, that includes a main mobile frame 11 carried on front steerable wheels, not shown, and rear traction wheels 12, 13. Provided on the frame 10 is a harvesting structure, indicated in its entirety by the reference numeral 15, and is composed of a base 16 supporting a boom 17. The boom 17 is controlled by a hydraulic cylinder 18 and carries at its outer or rear end a second boom 19 which is controlled by a hydraulic cylinder 20. On the free end of the boom 19 is a log-gripping device 21 and directly beneath the gripping device 21 is a log-shearing device 22. The devices 21, 22 may be controlled angularly about the end of the boom 19 by a hydraulic cylinder 23. The base 16 is supported on the main frame 11 just forwardly of a transverse axle structure 24 that extends between the traction wheels 12, 13. A cable winch or takeup device 25 is positioned forwardly of the post 16. Referring to FIGS. 2 and 3, the entire post 16 as well as the harvesting structure is removed from the frame 11 so as to more fully understand the operation of the accumulator or log-pulling device presently to be described.

Bolted at 26 to the transverse axle structure 24 is a rearwardly projecting U-shaped structure 27 that includes a transverse bight portion 28 and a pair of rearwardly extending and diverging rigid leg or arm portions 29, 30. The bight portion 28 is of channel structure so as to afford strength to the structure 27 and is fixed to the forward surface of an upright plate 31. The plate 31 extends downwardly beneath the arms 29, 30 and just rearwardly of the axle structure 24. The plate 31 operates as a striker plate upon which ends of logs or trees may strike when the accumulator is used. The plate 31 is of heavy structural steel to withstand the heavy shock loads that may be brought against it.

The rear or free ends of the fixed arms 29, 30 are provided with upper and lower rearwardly projecting brackets 33, 34 and 35, 36 respectively so as to define yokes on the ends that receive vertically disposed pivot pins 37, 38 respectively. Supported on the pins 37, 38 is a pair of extension arms 40, 41. The arms 40, 41 have rearwardly projecting brackets 42, 43 and 44, 45 that fit directly inwardly of the respective brackets 33, 34 and 35, 36 so as to be limited in axial or vertical movement in respect to the fixed arms 29, 30. The pins 37, 38 extend through the extension arm brackets 42, 43 and 44, 45. Torsion springs, such as at 46, are carried on the pivot pins 37, 38. Each of the torsion springs 46 has one end anchored against the respective fixed arm 29, 30 and the other end bearing against the respective extension arm 40, 41. The springs 46 bias the arms 40, 41 to their open position in which they project directly rearwardly as shown in FIG. 2. In their closed position the arms 40, 41 extend almost directly across the U-shaped frame 27 and substantially close the transverse expanse of the frame. Abutment or limiting means in the form of lugs 50 extend downwardly and upwardly from the bracket plates 33, 34, 35 and 36 to engage stops such as at 51, 52 on the respective inner brackets 42—45. As may best be seen from viewing FIG. 4, the lugs 50 and stops 52 generally limit the forward movement of the arms 40, 41 to their transversely aligned position and the stops 51, when bearing against the lugs 50, will limit movement of the extension arms 40, 41 to a substantial fore-and-aft disposition. The torsion springs 46 will cause the arms 40, 41 to move to the rearward or open position in which the stops 51 engage the lugs 50. It should here be noted that while the arms 29, 30 and 40, 41 have been described as being substantially horizontal, they do in fact extend in a rearward and downward direction so that the free ends of the arms 40, 41 are relatively close to the ground. This will operate to an advantage since it is necessary to often move logs by the gripping device 21 above the entire accumulator assembly. Also, it should be recognized that the pivot pins 37, 38 are slightly inclined rearwardly to permit the arms 40, 41 to depend lower than the fixed arms 29, 30.

Supported on the free ends of the arms 40, 41 is a pair of U-shaped brackets 55, 56 that project from the arms and provide vertically extending openings through which a cable 57 may extend. Carried in the openings are upper rollers 58, 59 respectively carried on pins 60, 61. Lower rollers 62, 63 that are transverse to the upper rollers 58, 59 are provided in the lower portion of the brackets 55, 56. The rollers 62, 63 are held on the respective brackets by bolts 64, 65.

A cable anchoring U-shaped eyelet 68 is welded to the upper portion of plate 31. An opening is provided in the transverse bight portion 28 of the U-shaped structure 27 and mounted within the transverse portion 28 adjacent the opening is a pair of vertical sheaves 66, 67 on which the cable 57 may bear as it moves through the opening as it is taken up or played out by the winch 25. The cable 57 is therefore anchored by the eyebolt 68 and extends therefrom through the U-shaped bracket 56 forming the opening at the end of the arm extensions and from thence to the opening in bracket 55 on the opposite arm extension 40. From there the cable extends forwardly through the opening in the transverse portion 28 and to the winch 25.

Figure 1:
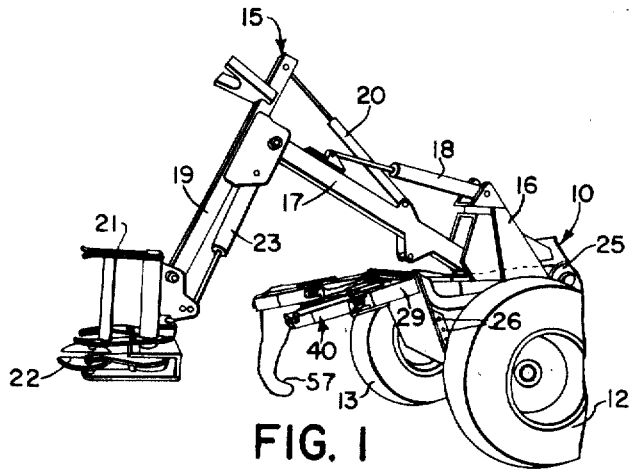
FIG. 1 is a side perspective view of a tree-harvesting structure and accumulator that is supported on the rear portion of a tractor.

In operation when there is slack in the cable 57 the arms 40, 41 will be biased by the springs 46 to their open or rearwardmost position. Since the pins 37, 38 are inclined rearwardly, there will also be a gravitational biasing to the open position of arm extensions 40, 41. Thus, as may best be seen from viewing FIG. 1, the entire bracket structure 27 will open both rearwardly and upwardly and the cable hanging in the catenary fashion between the free ends of the arms 40, 41 will be located considerably rearwardly of the traction wheels 12, 13. Therefore, the wheels 12, 13 will not in any manner interfere with the gripping device 21 laying an end of a log onto the cable that extends between the arm extensions.

Figure 4:
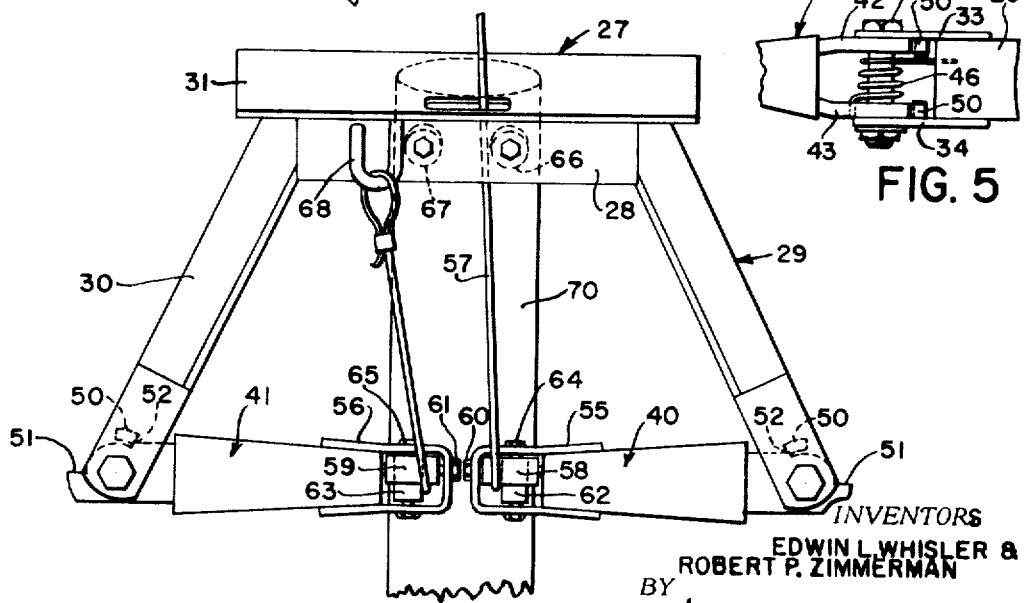
FIG. 4 is a plan view of the accumulator.

A log, as indicated at 70 in FIGS. 2, 3 and 4, will first be positioned on the cable 57. Slack is then taken up by the winch 25 and the extension arms 40, 41 will tend to draw inwardly as the cable tightens due to the weight of the log or tree 70. There will normally be sufficient friction between the cable and the surface of the tree that as the arms are drawn forwardly and inwardly the tree 70 will also be pulled forwardly until the end thereof abuts against the crash plate 31. As the arms continue inwardly and forwardly, they will reach a position in which the stops 52 engage the abutments 50 and the cable 57 may then be drawn tightly around the log 70. Therefore, as the arm extensions 40, 41 are moved to their closed or transporting position, it will be noted that the position of support for the log is relatively close to the tractor axle 24. When in transport there is a natural tendency for a cable supported log or tree to swing on the cable due to roughness of the terrain. However, by placing the butt end of the log or tree 70 against the crash plate 31, any movement will be dampened. It is also obvious that more than one tree or log could be carried or bunched by the cable 57 merely by leaving the U-shaped structure 27 open until more than a single tree or log is placed on the cable 57. Also, should it be desired to aid the log 70 in moving adjacent the crash plate 31, the tractor 10 may be backed slightly as the arm extensions 40, 41 are moved to their closed position.

We claim:

1. A log-pulling device composed of a main mobile frame; a rearwardly opening U-shaped structure composed of a transverse upright striker plate section and a pair of transversely spaced rearwardly projecting rigid arms; vertical pivot means on the rear ends of the arms; a pair of rearwardly projecting swingable arms carried at their forward ends on the pivots and adapted to swing inwardly and rearwardly from an open position in which they are directed rearwardly to a closed position whereby the free ends are closely adjacent one another; a winch structure; and a cable having one end anchored in respect to the frame played through and extending between the free ends of the swingable arms in catenary fashion, said cable being attached to the winch structure whereby the latter may cause the swingable arms to move between their open and closed positions and to take up the cable between the free ends of the swingable arms.

2. The structure as set forth in claim 1 further characterized by biasing means between the swingable and free arms for forcing the swingable arms to their open positions.

3. The structure as set forth in claim 1 in which the swingable arms are in alignment transverse to the rigid arms when they are in their closed position.

4. A log-pulling device comprising a main mobile frame; a U-shaped structure including a pair of rearwardly projecting arms; arm extensions pivotally carried on the rear ends of the arms to swing between an open position in which the extensions extend rearwardly in a rearward continuation of the respective arms whereby the U-shaped structure and arm extensions open both rearwardly and vertically and a closed position whereby the extensions substantially traverse the transverse expanse between the rearwardly projecting arms; a winch on the frame; and cable means anchored at one end and adapted to extend between the extensions in catenary fashion and connected at the opposite end to the winch whereby the winch may be utilized to move the extensions to their closed position.

5. The structure as set forth in claim 4 in which the arms diverge outwardly and downwardly to their rear ends, and the extensions are pivotally connected to the rear ends to swing about rearwardly inclined axes.

6. The structure as set forth in claim 4 further characterized by a striker structure supported by the frame at the forward end of and in depending relation to U-shaped structure for receiving the forward ends of logs drawn forwardly by the extensions being forced to their closed position.

7. The structure as set forth in claim 6 in which the striker structure includes a plate facing rearwardly and disposed beneath the rigid arms.

8. The structure as set forth in claim 4 in which the cable means is a single strand of cable having its one end anchored to the U-shaped structure and extending therefrom through the free end of one extension and from thence through the free end of the other extension and from thence to the winch.

9. The structure as set forth in claim 8 in which the extensions have openings through which the cable strand extends and characterized by a pair of rollers in each opening, one being above the other and in transverse relation thereto.

10. The structure as set forth in claim 4 in which the extensions are carried on the arms by vertical pivot means, and the arms and extensions have abutment means thereon engageable to limit rearward outward movement of the extensions to their open positions and forward inward movement to their closed positions.

11. The structure as set forth in claim 10 further characterized by biasing means between the extensions and arms for forcing the extensions to their open positions.

12. The structure as set forth in claim 11 characterized by the biasing means being in the form of torsion springs on the vertical pivot means with opposite ends thereof being anchored to the arms and extensions respectively.

13. The structure as set forth in claim 4 in which the mobile frame is a tractor frame having transversely spaced traction wheels interjoined by a transverse axle structure, the U-shaped structure is fixed to the tractor frame closely adjacent the axle structure and projects rearwardly therefrom whereby as logs are loaded on the portion of cable extending in catenary fashion between the extensions it will be considerably rearwardly of the axle structure and when the extensions are moved to closed position, the load applied on the tractor will be relatively close to the axle structure.

14. A log-pulling device comprising a main frame; a horizontally disposed U-shaped structure mounted on the frame extending rearwardly and opening rearwardly, with each of the sides thereof being composed of a fixed and a horizontally shiftable arm with the latter being adapted to move horizontally toward the opposite shiftable arm to traverse the spacing between the sides; a takeup device on the frame; and a cable having one end anchored to the frame and extending between the shiftable arms in catenary fashion and having its opposite end connected to the takeup device to cause the shiftable arms to move toward each other.